United States Patent [19]

Singer et al.

[11] Patent Number: 5,153,020

[45] Date of Patent: Oct. 6, 1992

[54] CARBOHYDRATE CREAM SUBSTITUTE

[75] Inventors: Norman S. Singer, Highland Park; Hsien-Hsin Chang, Lake Zurich; Pamela Tang, Palatine; John M. Dunn, Buffalo Grove, all of Ill.

[73] Assignee: The NutraSweet Company, Deerfield, Ill.

[21] Appl. No.: 678,897

[22] Filed: Mar. 28, 1991

Related U.S. Application Data

[63] Continuation of Ser. No. 367,322, Jun. 20, 1989, abandoned, which is a continuation-in-part of Ser. No. 211,494, Jun. 24, 1988, Pat. No. 4,911,946.

[51] Int. Cl.$^5$ .......................... A23L 1/307; A23L 1/05
[52] U.S. Cl. .................................... 426/567; 426/570; 426/572; 426/582; 426/583; 426/586; 426/589; 426/658; 426/804
[58] Field of Search ............... 426/104, 658, 804, 565, 426/566, 567, 582, 583, 586, 589, 602, 605

[56] References Cited

U.S. PATENT DOCUMENTS

| | | | |
|---|---|---|---|
| 2,801,242 | 7/1957 | Kerr et al. ...................... | 426/578 X |
| 3,023,104 | 2/1962 | Battista .................... | 426/96 |
| 3,573,058 | 3/1971 | Tiemstra ...................... | 426/804 |
| 3,867,554 | 2/1975 | Sucher et al. .......................... | 426/60 |
| 4,103,037 | 7/1978 | Bodor et al. ......................... | 426/575 |
| 4,122,196 | 10/1978 | Robbins et al. ......................... | 426/60 |
| 4,143,163 | 3/1979 | Hutchinson et al. ................. | 426/96 |
| 4,143,174 | 3/1979 | Shah et al. ........................ | 426/570 |
| 4,169,160 | 9/1979 | Wingerd et al. ...................... | 426/40 |
| 4,209,503 | 6/1980 | Shah et al. ............................ | 424/49 |
| 4,263,334 | 4/1981 | McGinley ............................ | 426/573 |
| 4,305,964 | 12/1981 | Moran et al. ......................... | 426/99 |
| 4,308,294 | 12/1981 | Rispoli et al. ....................... | 426/564 |
| 4,375,481 | 3/1983 | Kuwabara et al. ................... | 426/93 |
| 4,438,148 | 3/1984 | O'Rourke et al. .................. | 426/579 |
| 4,452,721 | 6/1984 | Turbak et al. ...................... | 252/310 |
| 4,510,166 | 4/1985 | Lenchin et al. ..................... | 426/565 |
| 4,563,360 | 1/1986 | Soucie et al. ........................ | 426/104 |
| 4,615,892 | 10/1986 | Morehouse et al. ................. | 426/250 |
| 4,707,374 | 11/1987 | King et al. ........................... | 426/572 |
| 4,734,287 | 3/1988 | Singer et al. ......................... | 426/41 |
| 4,744,987 | 5/1988 | Mehra et al. ........................ | 424/156 |
| 4,762,726 | 8/1988 | Soucie et al. ....................... | 426/602 |
| 4,810,646 | 3/1989 | Jamas et al. ........................ | 435/101 |
| 4,814,195 | 3/1989 | Yokoyama et al. ................. | 426/633 |
| 4,828,396 | 3/1989 | Singer et al. ....................... | 99/453 |
| 4,894,250 | 1/1990 | Musson et al. ...................... | 426/573 |
| 4,959,466 | 9/1990 | White ................................ | 426/804 |
| 4,962,094 | 10/1990 | Jamas .................................. | 514/892 |
| 4,963,383 | 10/1990 | Nozaki et al. ....................... | 426/804 |
| 5,011,701 | 4/1991 | Baer et al. ........................... | 426/804 |

FOREIGN PATENT DOCUMENTS

| | | |
|---|---|---|
| 0040452 | 10/1978 | Australia ........................ 426/658 |
| 340035 | 11/1989 | European Pat. Off. . |
| 347402 | 12/1989 | European Pat. Off. . |
| 8900325 | 11/1989 | PCT Int'l Appl. . |
| 8904734 | 5/1990 | PCT Int'l Appl. . |

OTHER PUBLICATIONS

FMC Pamphlet, "The plural of cellulose is Avicel mcc." (1984).
Hood, et al., J. Food Sci., vol. 39, pp. 117–120 (1974).
Atwell, et al., Characterization of Quinoa Starch, Cereal Chem., 60:9 (1983).

Primary Examiner—Jeanette Hunter
Attorney, Agent, or Firm—Marshall, O'Toole, Gerstein, Murray & Bicknell

[57] ABSTRACT

A fat substitute is disclosed which comprises water-dispersible macrocolloid particles composed of carbohydrate materials which particles have a substantially spheroidal shape and a specific particle size distribution effective to impart the substantially smooth organoleptic character of an oil-and-water emulsion.

17 Claims, No Drawings

CARBOHYDRATE CREAM SUBSTITUTE

This application is a continuation of application Ser. No. 07/367,322, filed Jun. 20, 1989, now abandoned which is a continuation-in-part of application Ser. No. 211,494, filed Jun. 24, 1988, now U.S. Pat. No. 4,911,946.

BACKGROUND OF THE INVENTION

The present invention relates to cream substitutes. In particular, substantially spheroidally shaped carbohydrate particles have a particle size distribution which causes the particles to mimic the mouthfeel of fat or cream in foods. Additionally, the present invention relates to methods of mimicking the mouthfeel of fat/cream and improved food products containing the present carbohydrate particles as a replacement for all or a portion of the fat/cream usually present in the food.

Fat substitutes are known in the art; for example, sucrose polyesters are a known class of liquid polymers useful as fat substitutes. However, sucrose polyesters are known to leach vitamins from the gut making the vitamins unavailable for use by the body. Additionally, the lower molecular weight sucrose polyesters cause a most distressing condition described in the medical and patent literature as "anal leakage." Anti-anal leakage agents for use in conjunction are also described in the literature to be used in conjunction with sucrose polyester fat substitutes. Higher molecular weight sucrose polyesters having viscous/solid/wax-like properties at the human body temperature of about 100° F. are reported to not cause anal leakage. However, these higher molecular weight sucrose polyesters only exhibit fat-like mouthfeel properties at relatively high temperatures requiring the quick ingestion of the food products containing them before they solidify to turn waxy. The utility of those high molecular weight sucrose polyesters is very limited. See, for example, European Patent Application 87870021.0 (Publication Number 0 236 288, published 9 Sep. 1987) and U.S. Pat. Nos. 3,600,186; 4,005,196; 3,954,976 and 4,005,195.

Singer, et al. U.S. Pat. No. 4,734,287 disclose non-aggregated particles of denatured whey protein as a fat/cream substitute, i.e., substantially smooth emulsion-like organoleptic character. The fat substitutes disclosed by Singer, et al. cannot be used in prolonged high temperature applications, i.e., frying, broiling, baking, because the whey protein particles will massively agglomerate thereby losing the emulsion-like character.

The present invention provides cream substitutes which are generally heat stable and which do not cause anal leakage in a person ingesting them.

It is well known that carbohydrates form gels. Starch and dextran can exist as, or be readily processed into, spheroidal form, such as, for example, SEPHADEX brand cross-linked dextran beads used in column chromatography. The size of these beads ranges from about 0.25 to 10 mm. These spheroidal forms of carbohydrates can be stabilized to the effects of heat, shear and acid. However, the formation of macrocolloidal particles of carbohydrates as described and claimed herein is unknown prior to the present invention.

SUMMARY OF THE INVENTION

Briefly, in accordance with the present invention, carbohydrate particles having a substantially spheroidal shape display fat-like mouthfeel characteristics when the hydrated particles have a mean diameter distribution in the range of from about 0.1 to about 4 microns with less than about 2 percent of the total number of particles over about 5 microns. The particles are non-aggregated and exhibit a substantially smooth organoleptic character of an oil-in-water emulsion. The present macrocolloid can replace all or a portion of the fat or cream in food products such as ice cream, yogurt, salad dressings, mayonnaise, cream, cream cheese, other cheeses, sour cream, sauces, icings, whipped toppings, frozen confections, milk, coffee whitener and spreads.

Of particular interest, starches, dextran, gums and celluloses are formed into stable suspensions of spheroidal particles having a particle size distribution effective to impart a substantially smooth organoleptic character of an oil-in-water emulsion, i.e., mouthfeel of fat/cream.

DETAILED DESCRIPTION OF THE INVENTION

In practicing the present invention, hydrated carbohydrate particles having a substantially spheroidal shape and a mean diameter particle size distribution between about 0.1 and about 4 microns with less than about 2% of the number of particles exceeding 5 microns, are added to fat/cream-containing food products to replace all or a portion of the fat/cream normally present in the food. The resulting food products have the creamy mouthfeel of their fatty counterparts.

Any carbohydrate which can attain a spheroidal or substantially round shape in the 0.1 to 5 micron diameter size range is acceptable in practicing the present invention. Suitable carbohydrates include starches, gums and cellulose. Mixtures of different carbohydrates can also be employed. Preferred carbohydrates include starches because they occur naturally as granules although most commonly-occurring starch granules are much larger than this range. Starches employed in the present invention are modified by cross-linking to prevent excessive swelling of the starch granules beyond this range. Modification by cross-linking is well-known to one skilled in the art. Suitable cross-linking agents include phosphates, phosphorous oxychloride and dicarboxylic anhydrides. A preferred starch is cross-linked quinoa starch which is a fine starch having a granule diameter of between about 1 and 5 microns.

Other suitable carbohydrates include calcium alginate, cross-linked dextran, gellan gum, curdlan, konjak, chitin, schizophyllan and chitosan. Carbohydrates which do not have a natural round shape must be treated so that they attain a substantially spheroidal shape. This can be accomplished by making a solution of the carbohydrate and converting the solution to a gel quickly and uniformly (typically in a field of high shear-force) so that a narrow distribution of gelled microparticles are formed having the above described diameters of between about 0.1 and 5 microns. Typically, a stream of carbohydrate solution is introduced into a highly turbulent reaction zone where the gelled microparticles are formed. High speed mixing and shearing conditions can also be employed.

Calcium alginate macrocolloidal particles are formed by making a solution of sodium alginate and introducing this solution into a calcium ion containing solution through, for example, an ultrasonic spray nozzle or any device producing droplets less than 5 microns in diameter. Gellan can be microparticulated by spray cooling a hot gellan solution via any device capable of producing droplets less than 5 microns resulting in the formation of spheroidally-shaped macrocolloidal particles. Konjak can be microparticulated by introducing a solution into a turbulent, heated, alkaline reaction zone.

The apparatus and mixing methods described in U.S. Pat. No. 4,828,396, the disclosure of which is herein incorporated by reference, are suitable for making the present microparticulated carbohyrates.

Once the carbohydrate macrocolloidal particles are formed, they must not substantially aggregate further and must remain that way. Aggregate blocking agents, for example, lecithin, pectin and xanthan gum, can be added to the macrocolloid to stabilize the particles. U.S. Pat. No. 4,734,287, which is herein incorporated by reference, discloses whey protein macrocolloids useful as fat substitutes and aggregate blocking agents.

The present carbohydrate macrocolloids will contain from about 1 to about 20 percent by weight carbohydrate, depending upon the water binding capacity of the specific carbohydrate. When added to food products, the hydrated macrocolloid is substituted generally on equal weight basis of the fat being removed, i.e., 1 part by weight fat/cream is replaced with 1 part by weight of hydrated macrocolloid. More or less macrocolloid can be employed based on the desired creaminess of the resulting food.

In similar embodiments, the various carbohydrate particles described herein act as a fat/cream substitute in foods. The carbohydrate macrocolloids of the present invention may also be combined with other fat substitutes including the proteinaceous macrocolloid fat substitutes of Singer, et al., U.S. Pat. No. 4,734,287, sucrose polyesters and the like. The carbohydrate particles are substantially spheroidal in shape and have a particle size distribution effective to impart an organoleptic character of an oil-in-water emulsion, i.e., a cream. The mean diameter particle size distribution ranges from about 0.1 to about $4\mu$, with less than about 2 percent of the total number of particles exceeding 5 microns in diameter.

EXAMPLES

EXAMPLE 1

Quinoa Starch Cream Substitute

According to this example, a cream substitute was prepared from starch isolated from quinoa grain. Whole quinoa grain (2400 grams, Chenopodium Quinoa Willd, from Quinoa Corp., Boulder, Colo.) was soaked according to the method of Atwell, et al., Characterization of Quinoa Starch, *Cereal Chem.*, 60:9 (1983), in 6 liters of 0.1M sodium acetate which had been adjusted to pH 6.5 with 20% HCl for a period of 24 hours at approximately 4° C. Eighty (80) gram portions of this material were blended at high speed for 1.5 minutes employing a Waring blender and then processed through a series of sieves. The final sieve in the series was a Number 400 U.S. Standard Testing Sieve. After sieving, the milky slurry was centrifuged at 3,000× g for 16 minutes. The top layer (light grey to light brown in color) as well as the water layer were discarded. The bottom layer (white) was resuspended in water and centrifuged again. The pellet obtained from the second centrifugation which contained the cleaned quinoa starch granules was vacuum dried (<40° C., 60 cm Hg), washed with ethanol to extract fat, filtered and vacuum dried again.

The extracted quinoa starch was then cross-linked according to the procedures of Kerr, et al., U.S. Pat. No. 2,801,242. Specifically, fifty grams of extracted starch was mixed with 120 grams of water and five grams of NaCl was added to raise the sodium concentration to 0.4M. Five (5) grams of sodium trimetaphosphate ($Na_3P_3O_9$) was then added to the suspension and the pH was adjusted to 11.60 with 4% NaOH. This material was then heated to 40° C. and held at this temperature for eight hours while mixing. The pH of this mixture was monitored hourly and readjusted to 11.60 with 4% NaOH when necessary. The reaction was terminated by adjusting the pH of the mixture to 5.2 with 20% HCl. The material was filtered, washed, refiltered and then vacuum dried resulting in cross-linked quinoa starch.

A mixture of cross-linked quinoa and carboxymethyl cellulose (CMC) (7HOFCMC, Aqualon Corp., Wilmington, Del.) was prepared by adding 0.15% (w/w) CMC to a 10% (w/w) dispersion of the cross-linked quinoa starch. The quinoa and CMC materials were heated to 95° C. while mixing, and were then cooled. Slurries of native quinoa and cross-linked quinoa in water were also heated to 95° C. and then cooled.

When native quinoa starch granules were subjected to heating, they swelled and those remaining intact at the end of the experiment had a particle size of 3.5 microns by light microscopy. The swollen granules appeared very diffuse and it was observed that most had disrupted (as is common for native starches).

The cross-linked starch granules resisted swelling and disruption when similarly subjected to heating and exhibited a particle size of 1 to 2 microns when observed by light microscopy. These particles were also denser and more spheroidal in shape than the heated native granules. The average particle size of the cross-linked granules determined by Coulter Counter MultiSizer analysis was 1.89 microns.

The cooked dispersion of native quinoa starch granules was a typical translucent white gel-paste that exhibited a pasty texture. The cross-linked quinoa, on the other hand, was a white, moderately viscous fluid that exhibited a smooth, somewhat creamy consistency. Dilute CMC (which alone is not creamy) was added to the cooked cross-linked quinoa starch resulting in a lower viscosity, pourable white fluid that exhibited an enhanced creamy texture.

EXAMPLE 2

Konjak Cream Substitute

According to this example, a cream substitute was prepared from konjak flour. A 9 ounce package of konjak (Amorphophalus Konjak, K. Koch from Vesugi Shokuhin Co., Japan) was blended with 300 to 400 grams of water in a Waring blender for 30 seconds at high speed. The sample was sheared employing a Silverson mixer equipped with a mixing head. A peristaltic pump (Master-Flex, Cole-Parmer Instruments) was employed at maximum speed to pump the sample through the mixing head in the direction opposing the direction of the shear of the mixer. The speed of the mixer was adjusted so that minimal flow through the system was attained and the sample was recirculated and sheared for 5 to 10 minutes. The sheared sample was then homogenized ten times at 620 bar (9000 psi) in a Rannie High Pressure Homogenizer (Model Mini-lab, type 8.30H, Rannie a/s, Albertslund, Denmark) and filtered through a Whatman Number 1 filter using a vacuum. The filtrate was then centrifuged to isolate the particulate.

The konjak particles present in the filtrate exhibited spheroidal shapes and ranged in size from 2 to 5 microns. The individual particles displayed a tendency to clump together in clusters. Coulter MultiSizer analysis also indicated that the particles ranged in size between 1.5 and 5 microns. The pellet of konjak particles formed as a result of centrifugation appeared translucent, gel-like and distinctly slippery to the touch.

EXAMPLE 3

Konjak Cream Substitute

According to this example, an alternative method was used for preparing a cream substitute from konjak flour. Water (168.32 grams) was added to a Kitchen-Aid 5 quart mixing bowl with a flat beater which was operated at speed setting number 4. Konjak flour (12.88 grams) was added during mixing which continued for two minutes. Additional water (205.12 grams) was heated to 180° F. and a volume equal to 25% of the water was added after the konjak flour had been mixed for two minutes. Mixing was continued and three more 25% volumes of hot water were added to the mixer at two minute intervals. Calcium hydroxide slurry (13.68 grams, 7% w/w) (J. T. Baker, Phillipsburg, N.J.) was then added to the solution and mixed for 30 seconds. The mixture was then placed in a container 1 to 2 inches deep, evenly distributed, where it was held overnight at 50° C. with nitrogen flush. After heating overnight, the mixture had formed into a firm gel.

The konjak gel was sliced into strips approximately 0.25 inch wide by 2.0 inches long which were added to a rotor/stator-type homogenizer (such as manufactured by Ross) along with 75 grams of water for every 100 grams of gel. The gel was sheared for five minutes at three quarter full speed. The material was then homogenized ten times at 800 bar (11,600 psi) using a Rannie High Pressure Homogenizer. The homogenized material was filtered through Whatman No. 1 filter paper with a Buchner funnel using vacuum and the slippery, pasty filter cake was transferred to a storage container when only paste remained. For every 100 grams of konjak gel used, approximately 10 grams of filter cake was obtained.

The filter cake was analyzed using image analysis with a Dapple software package (Dapple Systems, Sunnyvale, Calif.) wherein dehydrated particles analyzed on a slide had a volume weighted mean equivalent diameter of 0.8 microns. Coulter MultiSizer analysis of the hydrated particles indicated that they had a volume mean diameter of 3.12 microns and a number mean diameter of 1.17. The number of particles was determined to be $1.39 \times 10^9$ in 1 ml of 1% solution. It is believed that the difference in diameters observed from the two methods may be partly due to the fact that using image analysis, the dried particles on a microscope slide were measured whereas hydrated particles were measured with the Coulter MultiSizer. The filter cake was found to provide a creamy and slippery mouthfeel.

EXAMPLE 4

Alginate Cream Substitute

According to this example, a cream substitute was produced from alginate. A solution of 0.5% (w/w) sodium alginate (Kelgin XL, Kelco Co., San Diego, Calif.) was prepared by mixing 4.0 grams of sodium alginate with 796 grams of water. The solution was centrifuged at $2000 \times$ g to remove the small amount of insoluble material. The clear solution was then introduced into the fluid processor apparatus described in U.S. Pat. No. 4,828,396 which had been modified slightly to conduct this example. Specifically, the port usually used for the placement of a thermocouple was replaced with a chromatographic septum inside of the hex nut. This allowed for the addition of calcium chloride solution with a 3 c.c. syringe and a 20 gauge needle while the fluid processor apparatus was in operation.

The fluid processor apparatus was filled with approximately 330 grams of the sodium alginate solution prepared above and after tightening the cover, the apparatus was turned on and run at 5720 rpm. A total of 18 ml of 2% $CaCl_2$ solution was added rapidly by syringe to the solution undergoing shear. The shearing continued for 10 more minutes after the calcium chloride addition. Cooling, necessitated by the mechanical heat generated by the apparatus, was achieved by circulating tap water through the jacket.

The resultant dispersion contained calcium alginate microparticles. The sizes of the microparticles were in the 1 $\mu$m range as observed by light microscopy. This observation paralleled the results obtained with a Coulter MultiSizer. The median particle diameter was 1.35 $\mu$m.

EXAMPLE 5

Alginate Cream Substitute

According to this example, an alternative method was used for preparing a cream substitute from alginate. A solution (150 grams) of 2% (w/v) sodium alginate (Kelgin XL, Kelco Co., San Diego, Calif.) was added to 400 grams of 10% (w/w) calcium chloride (Mallinkrodt, Paris, Ky.) while mixing on a Dispermat mixer at 500 rpm. The materials were mixed for five minutes to ensure reaction of all alginate. The precipitate was allowed to settle and excess solution was siphoned off.

The remaining solution and precipitate were introduced into the fluid processor apparatus described in U.S. Pat. No. 4,828,396 and sheared for 10 minutes at 5270 rpm while tap water was run through the fluid processor apparatus to keep the solution cool. The sheared material was then filtered through Whatman No. 1 filter paper and a Buchner funnel using vacuum. The filter cake was resuspended in an approximately equivalent amount of water and was homogenized ten times at 800 bar (11,600 psi) using a Rannie High Pressure Homogenizer. The homogenized material was then filtered through Whatman No. 1 filter paper with a Buchner funnel and vacuum. The precipitate was transferred to a storage container when only paste remained. The material was analyzed using image analysis with a Dapple System which indicated a volume weighted mean equivalent diameter of 0.88 microns. The filter cake was found to provide an initially creamy mouthfeel with some powderiness becoming perceptible upon swallowing. This is believed to be a consequence of the somewhat larger size of the alginate particles (as compared to the konjak particles).

The foregoing specific examples are provided for purposes of illustration only and it will be apparent to one of ordinary skill in the art that many changes and modifications can be made thereto. Therefore, the scope of the invention is to be limited solely by the appended claims.

What is claimed is:

1. A water-dispersible macrocolloid comprising substantially non-aggregated macrocolloidal particles of carbohydrate having a substantially spheroidal shape and a mean particle-size distribution ranging from about 0.1 microns to 4 microns, with less than about 2% of the total number of particles exceeding 5 microns in diameter, the particles in a hydrated state effective to form a macrocolloid having the substantially smooth organoleptic character of an oil-in-water emulsion wherein the particles are comprised of a starch, dextran, gum, konjak, cellulose or mixtures thereof.

2. The water-dispersible macrocolloid of claim 1 wherein the particles are a starch.

3. A water-dispersible macrocolloid comprising substantially non-aggregated macrocolloidal particles of carbohydrate having a substantially spheroidal shape and a mean particle-size distribution ranging from about 0.1 microns to 4 microns, with less than about 2% of the total number of particles exceeding 5 microns in diameter, the particles in a hydrated state effective to form a macrocolloid having the substantially smooth organoleptic character of an oil-in-water emulsion wherein the particles are cross-linked quinoa starch, cross-linked dextran, konjak or calcium alginate.

4. A method of simulating the mouthfeel of fat and/or cream in a food product which comprises providing to said food product a water-dispersible macrocolloid of substantially non-aggregated hydrate carbohydrate particles having a substantially spheroidal shape and a mean particle size distribution ranging from about 0.1 microns to about 4 microns with less than about 2% of the total number of particles exceeding 5 microns in diameter, having the substantially smooth organoleptic character of an oil-in-water emulsion wherein the particles are comprised of a starch, dextran, gum, konjak, cellulose or mixtures thereof.

5. The method of claim 4 wherein the particles are a starch.

6. A method of simulating the mouthfeel of fat and/or cream in a food product which comprises providing to said food product a water-dispersible macrocolloid of substantially non-aggregated hydrated carbohydrate particles having a substantially spheroidal shape and a mean particle size distribution ranging from about 0.1 microns to about 4 microns with less than about 2% of the total number of particles exceeding 5 microns in diameter, having the substantially smooth organoleptic character of an oil-in-water emulsion wherein the products are cross-linked quinoa starch, cross-linked dextran, konjak or calcium alginate.

7. In a food product containing fat and/or cream, the improvement which comprises:
substituting for all or a portion of the fat and/or cream, a water-dispersible macrocolloid of substantially non-aggregated hydrated carbohydrate particles having a substantially spheroidal shape and a mean particle-size distribution ranging from about 0.1 microns to about 4 microns with less than about 2% of the total number of particles exceeding 5 microns in diameter, effective to form a macrocolloid having the substantially smooth organoleptic character of an oil-in-water emulsion wherein the particles are a starch, a gum, cellulose, dextran, konjak or mixtures thereof.

8. The improved food product of claim 7 wherein the particles are a starch.

9. In an improved food product containing fat and/or cream, the improvement which comprises:
substituting for all or a portion of the fat and/or cream, a water-dispersible macrocolloid of substantially non-aggregated hydrated carbohydrate particles having a substantially spheroidal shape and a mean particle-size distribution ranging from about 0.1 microns to about 4 microns with less than about 2% of the total number of particles exceeding 5 microns in diameter, effective to form a macrocolloid having the substantially smooth organoleptic character of an oil-in-water emulsion wherein the particles are a cross-linked quinoa starch, cross-linked dextran or calcium alginate.

10. The improved food product of claim 7 or 9 which is an analog of an ice cream frozen dessert product.

11. The improved food product of claim 7 or 9 which is an analog of a high acid product selected from the group consisting of salad dressings and mayonnaise.

12. The improved food product of claim 7 or 9 which is an analog of a solid dairy product selected from the group consisting of cheeses and cream cheese.

13. The improved food product of claim 7 or 9 which is an analog of a fermented diary product selected from the group consisting of sour cream and yogurt.

14. The improved food product of claim 7 or 9 which is an analog of a dairy product selected from the group consisting of milk and cream.

15. The improved food product of claim 7 or 9 which is an analog of a semi-solid product selected from the group consisting of icings and spreads.

16. The improved food product of claim 7 or 9 which is an analog of a whipped topping.

17. The improved food product of claim 7 or 9 which is an analog of a sauce.

* * * * *